July 28, 1931.  C. WEEKS  1,816,240
HOLDER FOR NONFLUID COSMETICS
Filed May 7, 1929
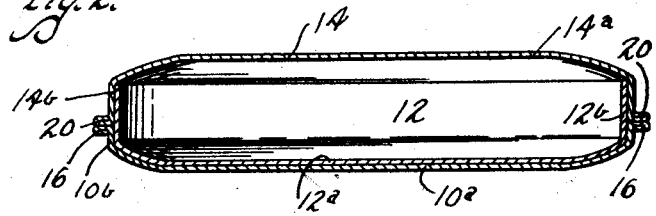
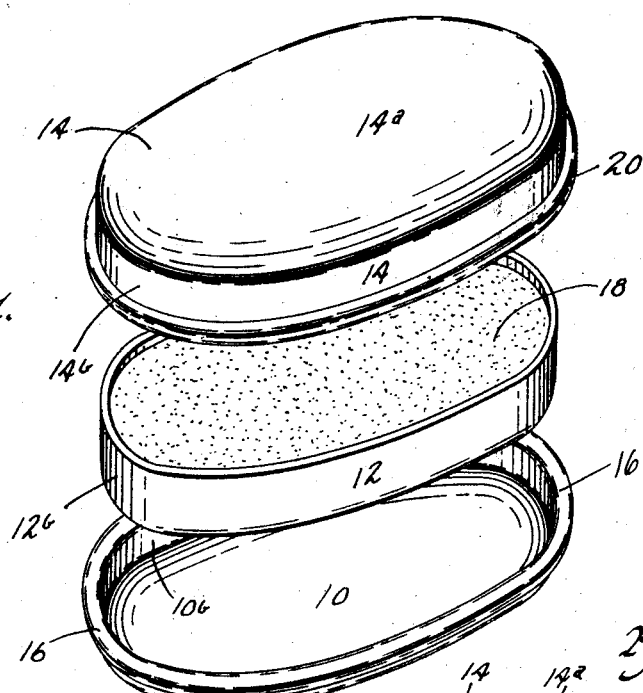
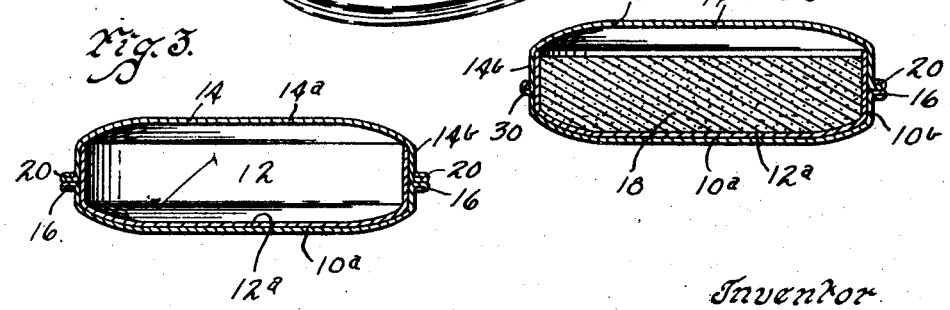

Patented July 28, 1931

1,816,240

UNITED STATES PATENT OFFICE

CARL WEEKS, OF DES MOINES, IOWA

HOLDER FOR NONFLUID COSMETICS

Application filed May 7, 1929. Serial No. 361,197.

My present invention has to do with a holder for non-fluid cosmetics, particularly adapted for use by men, and of such shape, size and construction as to be especially adapted to be carried with a toilet kit or in a traveling bag or the like.

More particularly it is my object to provide a holder for non-fluid cosmetics having a lower casing member, a refill container adapted to be snugly and frictionally held and gripped therein, and to project upwardly therefrom, and a top or cover member adapted to fit over the refill container and to frictionally engage therewith and fit snugly against the lower or bottom member.

With these and other objects in view, my invention consists in the construction, arrangement and combination of the various parts of my holder for non-fluid cosmetics, whereby the objects contemplated are attained, as hereinafter more fully set forth, pointed out in my claim, and illustrated in the accompanying drawings, in which:

Figure 1 shows a perspective view of a holder for non-fluid cosmetics embodying my invention, parts being spaced to show their relative sizes and relations.

Figure 2 is a longitudinal, central, sectional view through the complete holder for non-fluid cosmetics embodying my invention.

Figure 3 is a transverse, sectional view through the same; and

Figure 4 is a similar view showing a modified form.

In the accompanying drawings, I have used the reference numeral 10 to indicate generally the bottom member of the casing, the numeral 12 to represent the refill container, and the numeral 14 to represent the top or cover member of the casing.

The casing forming a part of my holder for non-fluid cosmetics includes the bottom member 10, the lower part of which is substantially concavo-convex, as shown at 10a, and is provided with the upstanding peripheral wall 10b, terminating in an outwardly projecting folded-over flange 16.

I provide for holding the non-fluid cosmetics 18 a refill container 12, having a bottom member 12a, which is concavo-convex to sit snugly against the lower portion 10a of the bottom 10.

The member 12 has extending upwardly from its bottom portion 12a a peripheral wall 12b of such size and shape as to fit snugly within the wall 10b and to be frictionally gripped thereby and to project upwardly therefrom, as illustrated for instance in Figures 2, 3 and 4.

The corners of the entire device are preferably rounded as shown.

It will be understood that the parts are made of such material as to afford proper resiliency for securing the desired frictional gripping between them.

The top or cover member 14 has its upper portion 14a concavo convex as shown, provided with a downwardly extending peripheral wall 14b at the lower edge of which is an outwardly projecting folded over flange 20.

The top member 14 and refill container 12 are of such size and shape that the wall 14b will snugly slip over the wall 12b and engage the latter for frictionally holding the three members 10, 12 and 14 together in the manner shown for instance in Figures 2, 3 and 4.

It will, of course, be understood that the general shape and outline of the cold cream holder may be varied to a considerable extent without departing form the general spirit and purpose of my present invention.

The entire device is very simple and of relatively inexpensive construction, has no projecting parts liable to interfere with packing or with carrying the holder in a traveling bag or the like.

The bottom and top members may be made of some expensive material, whereas the refill container 12 may be made of less expensive material, so that after the cream 18 or other contents therein have been used, the refill container can be thrown away if desired and another installed in its place.

The flanges 20 and 16 are convenient for manipulating the parts for inserting and removing the refill container 12 and taking off and replacing the top or cover member 14.

Figure 4 is a cream holder similar to that already described with the exception that the flanges 16 and 20 at one side are hingedly connected together as at 30.

I claim as my invention:

In a device of the class described, a lower casing member having a bottom and an upstanding peripheral wall provided with an out-turned flange, a removable refill container frictionally held therein, comprising a bottom portion having an upstanding peripheral wall extending above the first wall, and an upper casing member having a down-turned peripheral wall provided with an out-turned flange, said down-turned wall being adapted to fit over and frictionally engage the portion of the wall of the refill container projecting above the peripheral wall of the lower casing with said out-turned flanges adjacent each other.

Des Moines, Iowa, Febrnray 27, 1929.

CARL WEEKS.